3,382,067
PREPARATION OF DOUBLE-LAYER ELECTRODES
Gerd Sandstede and Horst Binder, Frankfurt am Main, and Alfons Köhling, Niederhochstadt, Taunus, Germany, assignors to Robert Bosch G.m.b.H., Stuttgart, Germany
Filed July 19, 1966, Ser. No. 566,416
Claims priority, application Germany, July 20, 1965, B 82,912
4 Claims. (Cl. 75—208)

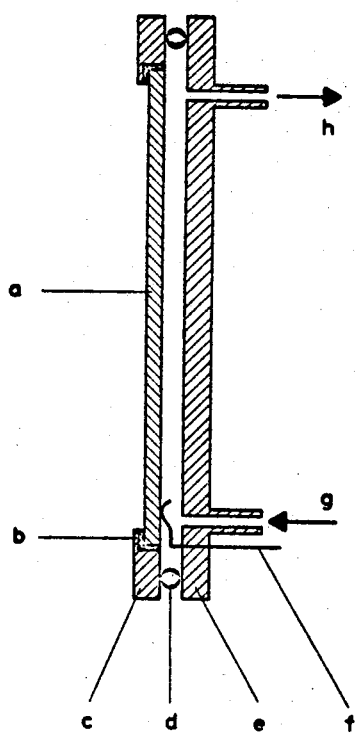

ABSTRACT OF THE DISCLOSURE

A bi-porous nickel electrode which contains silver as catalyst, is prepared by compacting two layers each of which contains nickel powder and silver carbonate, and only one of which contains in addition a pore forming agent. Conversion of the silver carbonate to metallic silver produces simultaneously the silver catalyst and a fine porous structure because the metallic silver takes up only about half the space of the silver carbonate. The pore-forming agent in the other layer is at least partly removed to produce coarse pores. After conversion of the silver carbonate to silver, the two-layered structure is sintered.

---

This invention relates to a method for the manufacture of a double layer nickel electrode for the cathodic reduction of oxygen while employing silver as catalyst. Such electrodes are useful as gas impermeable electrodes in galvanic fuel cells.

Porous electrodes for the cathodic reduction of the oxygen are known. Also silver has been used as a catalyst for the oxygen electrode. For instance, a porous electrode skeleton of graphite or nickel has been impregnated with silver salt solutions, and the silver catalyst has been precipitated.

The manufacture of silver containing sintered electrodes is also known. For instance, a sintered electrode containing Raney silver as the catalyst (double skeleton catalyst electrode) is obtained by mixing a powdery Raney silver-aluminum alloy and carbonyl nickel powder, forming said mixture by compacting and sintering into an electrode body, and finally dissolving the aluminum out of the electrode body, e.g. with a sodium hydroxide solution.

The Raney method has the advantage of producing particularly active microporous silver. On the other hand, the sintering step makes difficulties because the Raney silver-aluminum alloy readily reacts with the nickel of the skeleton which affects the electrochemical activity as well as the mechanical stability of the electrodes. Stable electrodes have been obtained by sintering silver powder or a mixture of silver powder and nickel powder. Such electrodes have the drawback that they lack microporosity.

Double layer electrodes have been made to prevent passage of the oxygen through the electrode into the electrolyte, e.g. potassium hydroxide. Such double layer electrodes have been made by sintering onto the electrode a thin finely porous nickel layer facing the electrolyte. When the gas pressure is made equal the capillary pressure of the electrolyte, the first electrode layer remains free of electrolyte, the second finely porous layer is gas impermeable.

Stable silver electrodes have been prepared also by pressing silver salts to discs and sintering said discs after decomposition of the salts. In this procedure, strong shrinkage takes place. The fine silver crystallites which are present at first, coalesce in the sintering process to coarser crystals, which reduces the inner surface of the electrode and therewith its activity.

It is, therefore, an object of the invention to provide an oxygen electrode which contains microporous silver and can be sufficiently sintered to obtain a satisfactory mechanical stability.

It is another object of the invention to provide a gas impermeable microporous silver containing electrode which is suitable for operation with air.

Other objects and advantages will be apparent from a consideration of the specification and claims.

The objects of this invention are accomplished by forming a fine-pore layer from a mixture of 40 to 80 percent by volume of silver carbonate and 60 to 20 percent by volume of fine nickel powder (carbonyl nickel) and by using for the coarser-pore layer a similar mixture which, however, contains loosely admixed thereto a pore-forming agent. Preferred pore-forming agents are ammonium hydrogen carbonate, ammonium amido carbonate, and ammonium carbonate, and mixtures of two or three of these compounds. They are employed in a particle size of less than $100 \mu m$. in a volume ratio of pore-forming agent to electrode-forming mixture as 1:5 to 1:1. Both layers are then pressed together under a pressure of 1.42 to $4.27 \times 10^4$ p.s.i. and sintered at a temperature of 550–650° C.

In addition to silver carbonate, we have investigated other silver salts for our purpose. However, it appears that silver carbonate gives the best results with respect to stability and micro-porosity. The reason may be that silver carbonate gives the most solid pressed bodies.

In order to prevent excessive coalescence of the silver crystallites on sintering, powders which are insoluble in potassium hydroxide solution, were admixed to the silver carbonate, e.g. graphite, molybdenum, silicon dioxide, titanium dioxide, magnesium oxide, calcium carbonate, cobalt, or nickel. All said powders prevented shrinkage of the pressed bodies on sintering but the thus obtained sintered bodies had very low strength. Partly, they could be ground between the fingers. Surprisingly, only cobalt and nickel additions produced stable electrodes, which had shrunk only by a few percent. This is surprising for the reason that silver alloys with cobalt and nickel as little as with the other recited materials. Electrochemical tests showed that the electrodes containing cobalt showed a considerable greater polarization than those containing nickel; it is probably produced by the oxide formation of the cobalt.

In the preparation of the electrodes according to the invention, the starting materials are finely powdered silver carbonate and carbonyl nickel powder. The desired fine porosity is obtained by the decomposition of the silver carbonate by heating in an inert gas, or by careful reduction in hydrogen. The remaining silver crystallites occupy only about half the volume of the silver carbonate. The layer at the gas side contains, in addition to said fine active pores, also coarse pores which are formed after removal of the pore-forming agent. The thickness of the layers is about 1 to 3 mm. The ammonium hydrocarbonate and/or ammonium amidocarbonate, and/or ammonium carbonate are removed from the pressed body by sublimation. Sometimes, it may be of advantage for the preparation to avoid formation of ammonia. In such a case, sodium carbonate or sodium hydrogen carbonate can be used as pore-formers and dissolved out after sintering. However, the electrodes have then lower activity.

Similarly, alkaline earth metal carbonates of a particle size of 10–80 μm. can be used. They give a smaller shrinkage of the diameter of the disc than the other carbonates, while the shrinkage of the thickness is the same. Other soluble salts such as sodium chloride or sulfate, affect the activity of the electrodes so much as to render them unsuitable as pore-forming agents. The amount of pore-forming agents can be in the range of 20 to 50 percent by volume. The greatest porosity must be produced for electrodes to be operated with air, so as to hinder as little as possible the diffusion of the oxygen through the nitrogen cushion. For operation with oxygen, a porosity of 20% is just still sufficient. Such electrodes are particularly stable and can, therefore, be prepared with large diameters.

In order to save silver, the silver in the fine-porous layer at the electrolyte side can be replaced by nickel carbonate. Thereby, the activity of the electrode is not modified because the effective zone of the electrode is at the gas side layer. In a methanol cell, such cell can be used only at room temperature, but in a hydrogen cell also at elevated temperature; in a methanol cell, the potential of the oxygen electrode is reduced from about 60° C. on by the presence of the methanol in the electrolyte, because the electrolyte side of the electrode consists only of nickel whose oxide layer is reduced by methanol. The electrode which contains silver also in the electrolyte-side layer is suitable for a methanol cell also at higher temperatures.

The biporous electrodes made in accordance with the invention require a gas pressure (oxygen or air) of 0.4 to 0.8 atm. over atmospheric pressure.

The invention will be described more in detail in the following examples, with reference to the accompanying drawing illustrating the use of an electrode disc according to the invention as an oxygen electrode.

In the drawing, an electrode disc $a$ is cemented by means of a suitable epoxy resin to a ring $c$ of a glass-like plastic in such a way that the coarser-porous layer faces the support $e$, which is made also of a synthetic resin. The ring $c$ is flanged to the support $e$ provided with a gasket $d$ in such a way that the silver-plated contact $f$ is pressed against the electrode $a$. A tube $g$ supplies the air or oxygen, and tube $h$ serves as outlet for the air of which part of the oxygen has been removed by the reaction. Said tube is connected with a needle valve and a flowmeter (not shown).

Example 1

Silver carbonate (60% by volume) is intimately mixed with carbonyl nickel powder (40% by volume) by grinding. 39 g. of said first mixture are filled into a cylindrical die of 90 mm. diameter, evenly distributed, and slightly compacted. Another mixture is prepared from 40 percent by volume of silver carbonate, 20 percent by volume of carbonyl nickel powder, and 40 percent by volume of ammonium hydrogen carbonate and/or ammonium amido carbonate, and/or ammonium carbonate, of a particle size of 80μm. First, the silver carbonate and carbonyl nickel powder are thoroughly mixed. In said mixture, the ammonium hydrogen carbonate, and/or ammonium amido carbonate, and/or ammonium carbonate, are then evenly and loosely distributed. They are not ground in so as to maintain essentially the particle size of the pore-forming ammonium compounds. 78 g. of said second mixture are evenly distributed in the die over said first mixture, and both layers are pressed together under a pressure of 130 mp. The pressed body is then heated at 150° C. to evaporate the ammonium salt, whereby application of a vacuum is of advantage. Then the silver carbonate is reduced with hydrogen at 200° C.; finally, the temperature is raised to 600° C. and held at said temperature for about 1 hour. In the sintering operation, the disc must be loaded with a weight of about 700 g. to remain completely plane.

The obtained disc is used as electrode as shown in FIG. 1 in a vessel containing 7 N potassium hydroxide solution, and a counter-electrode and hydrogen comparison electrode are placed in the same vessel. After heating at 70° C., air is supplied to the support, and the pressure is so adjusted that no air bubbles into the electrolyte. The electrode can now be operated as air oxygen cathode. The rate of flow of the air is adjusted according to the current intensity. If 50% of the oxygen shall be consumed, 2.2 l./h. are required for 1 amp. At a current density of 100 ma./cm.², the electrode has, under the recited conditions, a stationary voltage of 840 mv. When operated with pure oxygen, the voltage rises to 900 mv. The open-circuit voltage adjusts itself to a value of 1080 mv.

Example 2

A mixture of 70 percent by volume of silver carbonate and 30 percent by volume of carbonyl nickel powder is prepared by grinding in a ball mill. The electrolyte side layer can be made somewhat more porous and thinner than in Example 1 because the ammonium salt is replaced by sodium carbonate so that the stability of the pressed body is not strained by expelling the carbonate. 26 g. of this first mixture are placed into the die. The second mixture, of the gas side layer, consists of 35 percent by volume of silver carbonate, 35 percent by volume of nickel, and 30 percent by volume of sodium carbonate. Said mixture, as well as the pressed body, is prepared as set forth in Exampe 1. Then the silver carbonate is converted to silver. In order to save hydrogen, said conversion can be obtained by thermal decomposition in an inert gas at 300° C. In the subsequent sintering operation, some hydrogen is added to reduce nickel oxide if present. The further preparation and use of the electrode is as described in Example 1.

Example 3

For the preparation of the electrolyte side layer, 50 percent by volume of carbonyl nickel powder are intimately mixed with 50 percent by volume of basic nickel carbonate (NiCO₃·2Ni(OH)₂·4H₂O). 32 g. of said mixture are placed in the die. For the layer at the gas side, 65 g. are used. Said mixture consists of 40 percent by volume of silver carbonate, 30 percent by volume of carbonyl nickel powder, and 30 percent by volume of one or more of the recited pore-forming ammonium salts. The preparation of the pressed bodies and the decomposition of the ammonium carbonates is as set forth in Example 1. The nickel carbonate is reduced with hydrogen at 300° C. After sintering, the electrode can be used as in Example 1.

Example 4

The procedure is as described in Example 2 but magnesium carbonate is used as pore-forming agent. At the sintering temperature, the magnesium carbonate is converted to magnesium oxide. This can be dissolved out by means of an ammonium chloride solution.

We claim:

1. A method for producing a bi-porous nickel electrode consisting of a fine-porous and a coarser-porous layer and suitable for the reduction of oxygen in fuel cells, said method comprising mixing silver carbonate and nickel powder to a first mixture containing by volume 40 to 80 percent of said silver carbonate and 60 to 20 percent of said nickel powder, admixing to a blend of silver carbonate and nickel powder containing said ingredients in the same volume ratio as said first mixture a pore-forming agent to form a second mixture which contains said pore-forming agent and said blend in a volume ratio of 1:5 to 1:1, forming a first and a second layer from said first and second mixture, respectively, in superposed relationship, pressing said superposed layers together under a pressure of 1.42 to 4.27×10⁴ p.s.i. to a compressed structure, converting the silver carbonate to silver metal which acts as a catalyst, and simultaneously producing by said conversion fine pores in said structure, removing at least part of said pore-forming agent so as to produce coarser pores in said second layer, and sintering the compressed structure at a temperature of 550 to 650° C., thereby forming a bi-porous electrode wherein said first layer constitutes the fine-porous electrolyte-side and said second layer constitutes the coarser-pored gas-side.

2. The method as claimed in claim 1 wherein said pore-forming agent is an ammonium carbonate compound selected from the group consisting of ammonium hydrogen carbonate, ammonium amido carbonate, ammonium carbonate, and mixtures thereof.

3. The method as claimed in claim 1 wherein said pore-forming agent is a member of the group consisting of alkali metal carbonates and alkaline earth metal carbonates.

4. The method as claimed in claim 1 wherein the silver carbonate of said first mixture is replaced by nickel carbonate.

References Cited

UNITED STATES PATENTS

| | | | |
|---|---|---|---|
| 1,988,861 | 1/1935 | Thorausch | 75—200 X |
| 2,159,763 | 5/1939 | Hensel | 75—208 X |
| 2,464,517 | 3/1949 | Kurtz | 75—208 |
| 2,517,223 | 8/1950 | Mantell | 75—222 X |
| 2,671,953 | 3/1954 | Balke | 75—222 X |
| 3,007,991 | 11/1961 | Duddy | 75—222 |
| 3,244,515 | 3/1966 | Grune | 75—208 |
| 3,287,112 | 11/1966 | Blaha | 75—222 |

FOREIGN PATENTS

| | | |
|---|---|---|
| 1,131,896 | 6/1962 | Germany. |
| 497,844 | 12/1938 | Great Britain. |

CARL D. QUARFORTH, *Primary Examiner.*

BENJAMIN R. PADGETT, *Examiner.*

A. J. STEINER, *Assistant Examiner.*